United States Patent [19]

Yamaguchi

[11] 4,366,489

[45] Dec. 28, 1982

[54] THERMAL RECORDING APPARATUS

[75] Inventor: Shingo Yamaguchi, Atsugi, Japan

[73] Assignee: Ricoh Company, Ltd., Tokyo, Japan

[21] Appl. No.: 227,963

[22] Filed: Jan. 23, 1981

[30] Foreign Application Priority Data

Feb. 6, 1980 [JP] Japan .................................. 55-12383

[51] Int. Cl.³ ........................ G01D 15/10; H05B 3/00
[52] U.S. Cl. ................................. 346/76 PH; 219/216
[58] Field of Search .................... 346/76 PH; 219/216

[56] References Cited
U.S. PATENT DOCUMENTS

| | | | |
|---|---|---|---|
| 4,070,587 | 1/1978 | Hanakata | 346/76 PH X |
| 4,091,391 | 5/1978 | Kozima et al. | 346/76 PH |
| 4,113,391 | 9/1978 | Minowa | 346/76 PH X |
| 4,262,188 | 4/1981 | Beach | 346/76 PH X |

*Primary Examiner*—George H. Miller, Jr.

*Attorney, Agent, or Firm*—Oblon, Fisher, Spivak, McClelland & Maier

[57] ABSTRACT

A thermal recording apparatus for use in a facsimile recording apparatus or the like. Thermal resistors arranged in a thermal recording head are divided into a predetermined number of groups. By group-selection circuits which constitute constant-voltage circuits and which are provided correspondingly to the groups of thermal resistors, the thermal resistors are actuated in a time-divisional manner so as to record image information on a thermosensitive recording paper, whereby each constant voltage circuit with a relatively small capacity is actuated in a time-divisional manner for driving the recording head. Thus, a regulated power supply apparatus with a large capacity is not required, so that the power consumption of the recording apparatus can be reduced and the size thereof can be decreased.

5 Claims, 3 Drawing Figures

# THERMAL RECORDING APPARATUS

BACKGROUND OF THE INVENTION

The present invention relates to a thermal recording apparatus and more particularly to a thermal recording apparatus for use with a facsimile apparatus.

In general, in an image information recording apparatus, such as a facsimile apparatus employing a thermal head, numerous thermal resistors are arranged in the thermal head. For instance, when image information is recorded on an A-4 size record sheet, normally 1728 thermal resistors are arranged per line in the thermal head, and, in the case of a B-4 size record sheet, as many as 2048 thermal resistors are used per line in the thermal head, with electric power being selectively supplied to those thermal resistors, depending upon the image information to be recorded. Furthermore, it is required that the electric energy supplied to the thermal resistors be constant. Otherwise, the heating value of each thermal resistor may vary, causing the image density of the image information recorded on the record sheet to become uneven.

Conventionally, in order to supply electric power of a constant, predetermined value to those thermal resistors regardless of the number of thermal resistors to be activated, a D.C. regulated power supply with a large power capacity is employed. Such a D.C. regulated power supply system is poor in power efficiency and much electric power is wasted within the power supply system. In addition, a large radiator or a cooling-fan for dispersing heat generated in the power supply system is required. As a result, the image information recording apparatus employing such a D.C. regulated power supply is oversized and expensive.

SUMMARY OF THE INVENTION

It is therefore an object of the present invention to provide a thermal recording apparatus having a thermal head which is driven without employing the conventional large-capacity D.C. regulated power supply, capable of producing high quality images with uniform image density. Since a large-capacity D.C. regulated power supply is not used, the thermal recording apparatus according to the present invention is small in size and inexpensive, and its power consumption is relatively low.

In order to attain this object, in the present invention, the thermal resistors arranged in the thermal head are divided into a plurality of groups. Each group of thermal resistors is activated in a time-divisional manner, and each drive circuit for supplying power to each group of the thermal resistors is stabilized.

DETAILED DESCRIPTION OF THE PREFERRED EMBODIMENT

Figure 1:
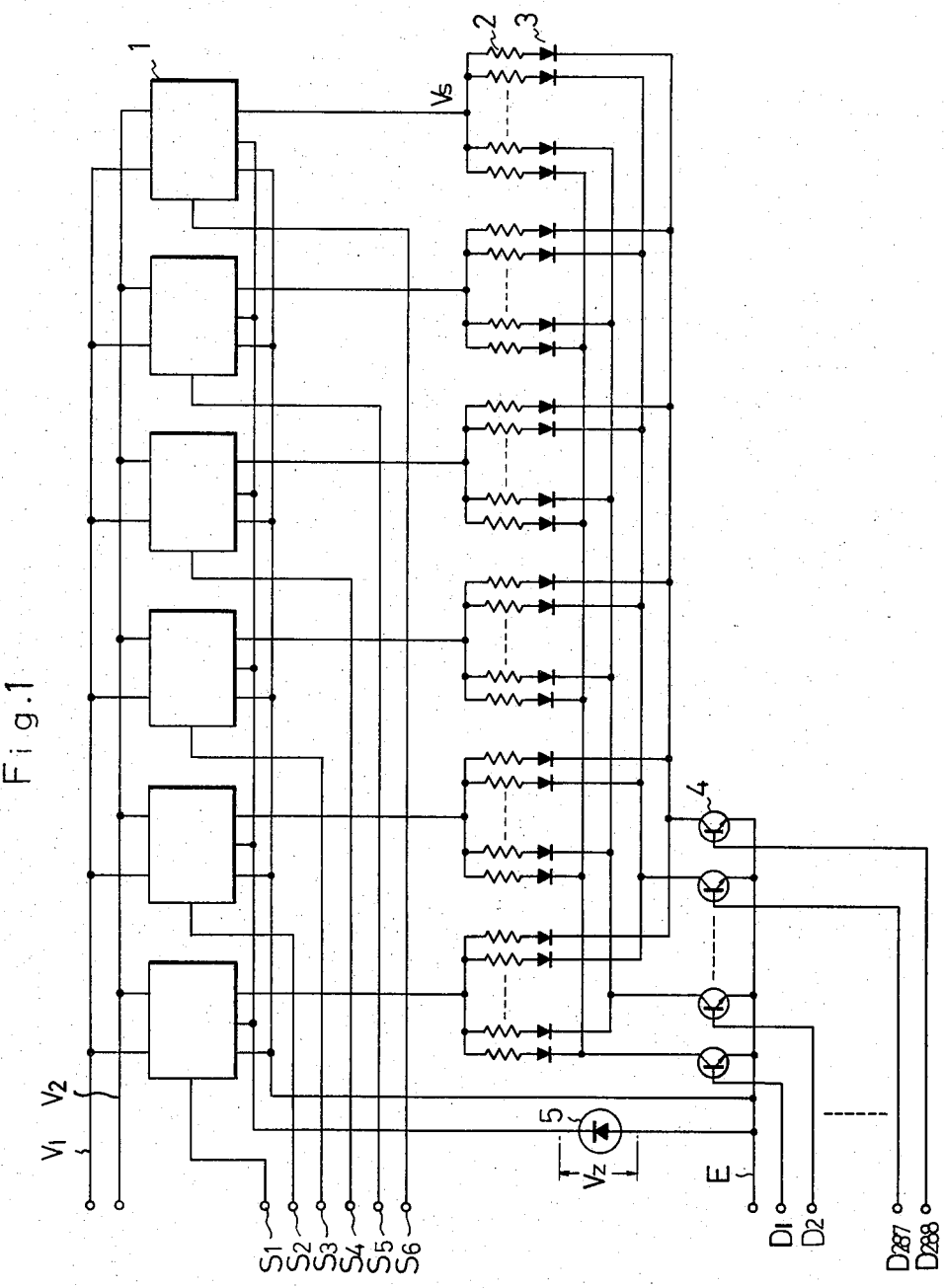
FIG. 1 is a circuit diagram of an embodiment of a thermal recording apparatus according to the present invention.

Referring to FIG. 1, an embodiment of a thermal recording apparatus according to the present invention will now be explained. In the figure, there is shown a circuit diagram of the thermal recording apparatus according to the present invention. Reference numeral 1 represents a group-selection drive circuit; reference numeral 2, thermal resistors which are arranged with equal space therebetween on a thermal head; reference numeral 3, a current-circulation-prevention diode, reference numeral 4, a thermal-resistor-driving transistor, and reference numeral 5, a Zener diode.

In this embodiment, 1728 thermal resistors 2 are arranged with equal space therebetween in the thermal head, in order to form 1728 image dots per line on an A-4 size record sheet. The 1728 thermal resistors are divided into 6 groups, each group consisting of 288 thermal resistors. Each group of thermal resistors is connected to one of six group-selection drive circuits 1.

The first, second, third, fourth, etc., thermal resistors in each group are respectively connected to the first, second, third, fourth, etc., thermal-resistor-driving transistor as shown in FIG. 1.

Figure 2:
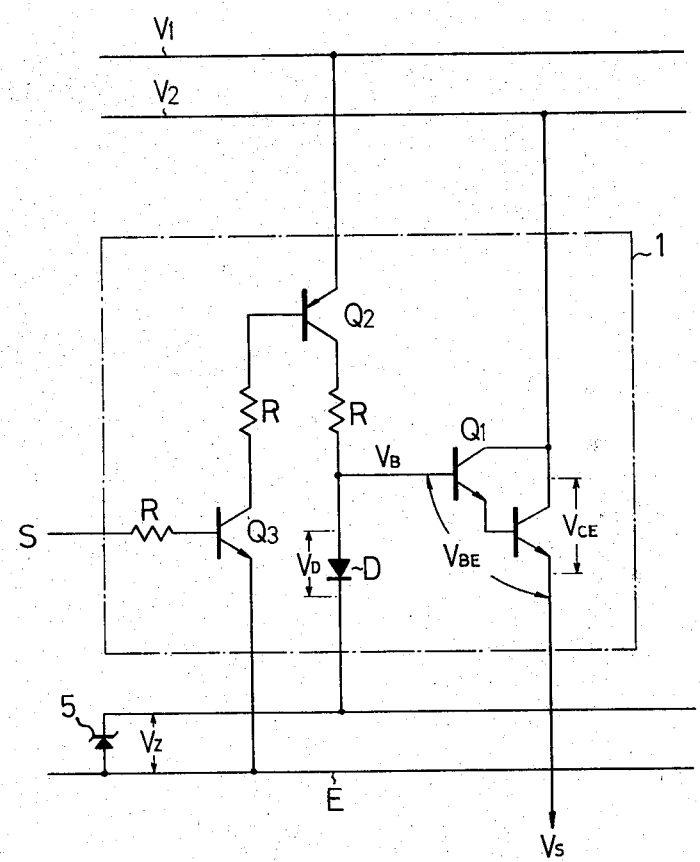
FIG. 2 is a specific example of a group selection drive circuit of the thermal recording apparatus in FIG. 1.

Referring to FIG. 2, there is shown an example of a group-selection drive circuit 1. In the drive circuit 1, there are connected to each other a transistor $Q_1$ with a Darlington connection for supplying electric power from a power supply line $V_2$ to the 288 thermal resistors 2 in each group, transistors $Q_2$ and $Q_3$, resistors R and a diode. Transistor $Q_2$, $Q_3$, resistors R and the diode are for applying a predetermined base voltage $V_B$ to the transistor $Q_1$ in order to actuate the transistor $Q_1$ selectively.

The power supply line $V_2$ and a power supply line $V_1$ connected to the transistor $Q_2$ can be connected to different power sources or to the same non-regulated D.C. power source.

In operation, the image information of 1728 bits per line is divided into six, so that 288-bit units of image information are successively input to the thermal-resistor-driving transistor 4, and in synchronization with the successive input of the 288-bit units of image information, group-selection drive signals $S_1 \sim S_6$ are successively input to the group-selection drive circuit 1.

As a result, the 288 transistors 4 are brought to the states of ON or OFF in accordance with the 288 bits of image information input thereto.

When a drive signal S is input to the drive circuit 1, the transistor $Q_3$ is actuated (ON), whereby a predetermined base voltage $V_B$ is applied to the base of the transistor $Q_1$.

The base of the transistor $Q_1$ is connected to a common line E through the diode D and a Zener diode 5. Therefore, when the Zener voltage is $V_Z$ and the voltage decrease of the diode D is $V_D$, the base voltage $V_B$ is $V_Z + V_D$. Thus, the base voltage $V_B$ is maintained substantially at a constant voltage.

At this moment, the voltage $V_{BE}$ across the base and the emitter of the transistor $Q_1$ is saturated so as to be nearly constant. As a result, the emitter voltage of the transistor $Q_1$, namely the output voltage $V_S$, is $V_B - V_{BE}$, so that even when the voltage of the power supply line $V_2$ is not stable, the output voltage $V_S$ is practically stable.

Therefore, a predetermined current flows constantly through the thermal resistors 2 regardless of the number of transistors 4 which are ON in accordance with the image information, that is, the number of the thermal resistors 2 which supply electric power to the transistors 4 through the power supply line V$_2$. As a result, a high quality record image with uniform image density can be produced.

The drive circuit 1 is actuated only when the drive signal S is input thereto, supplying constant electric power to predetermined thermal resistors 2. Normally, no current flows through the drive circuit 1, so that there is no power consumption, thereby attaining an extremely high degree of power efficiency.

When the drive circuit 1 is in operation, the voltage V$_{CE}$ across the collector and emitter of the transistor Q$_1$ is unsaturated. Therefore, in operation, the electric power is consumed in accordance with the current which flows through the transistor Q$_1$, whereby heat is generated. However, the electric current which flows through the transistor Q$_1$ is only 1/6 the current which flows through the 1728 thermal resistors 2. Accordingly, the heat generated is reduced to 1/6. Therefore, the radiator can be decreased in size and no cooling fan is required.

Figure 3:
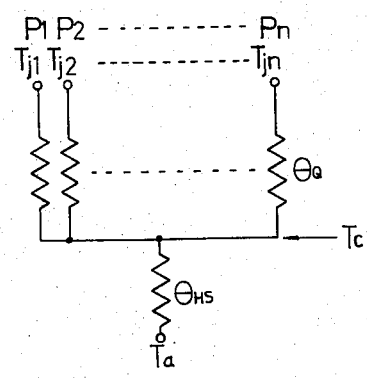
FIG. 3 is a circuit diagram indicating the transmission of heat generated in a transistor, which figure illustrates the advantages of the present invention.

In general, when transistors are attached to a radiator having a $\theta_{HS}$ heat resistance, and the heat losses of the transistors are P$_1 \sim$ P$_n$, and the temperatures of the junctions of the transistors are T$_{jl}\sim$T$_{jn}$, and the heat resistance between each junction and the case is Q, and the ambient temperature is Ta and the temperature of the case is Tc, the heat transfer can be represented by an equivalent circuit shown in FIG. 3 and the following relationships hold:

$$Tc = Ta + \theta_{HS} \cdot Pn \quad (1)$$

$$T_{jn} = Tc + \theta_Q \cdot Pn \quad (2)$$

The junction temperature of each transistor, T$_{jn}$, is represented by the following equation:

$$T_{jn} = P(\theta n/n + \theta_{HS}) + Ta \quad (3)$$

where $$P = \Sigma Pn, P_1 = P_2 Pn = P/n \quad (4)$$

From Equation (3), it can be seen that the greater the number of transistors which distribute the overall heat loss P, the lower the junction temperature of each transistor.

In this embodiment, the overall heat loss P is distributed to 6 transistors Q$_1$. Therefore, the junction temperature of each transistor, T$_{j6}$, is as follows:

$$T_{j6} = P(\theta_Q/6 + \theta_{HS}) + Ta \quad (4)$$

In comparison with the junction temperature in conventional apparatuses, the junction temperature of each transistor in this embodiment is significantly decreased.

For instance, when a conventional D.C. dropper-type stabilized apparatus employing 3 control transistors for supplying constant power to 1728 thermal resistors 2 is used, the overall heat loss P is distributed to the 3 transistors. As a result, the junction temperature of each transistor is $$P(\theta_Q/3 + \theta_{HS}) + Tc$$

In contrast to this, in the present embodiment, the junction temperature of each transistor is represented by Equation (4). Therefore, in comparison with the conventional apparatus, the junction temperature can be decreased by 1/6 P·$\theta_Q$ in the present embodiment when the ambient temperature is the same and the same radiator is employed, whereby the reliability of the transistors can be increased significantly. For instance, in the EIAJ-Tc-3 type Package in general use, $\theta_Q \approx$ 2C/W. When the overall heat loss P is 80 W, the junction temperature can be decreased by 26.7° C.

In other words, when the junction temperature is the same, the heat loss P is distributed to 6 transistors Q$_1$ in the present embodiment, whereby the radiator can be decreased in size in comparison with the radiator for use with the conventional apparatus, and no cooling fans are required.

The number of the thermal resistors arranged in the thermal head and the number of the group-selection drive circuits for supplying electric power to the thermal resistors in a time-divisional manner can be selected as desired in the present invention.

The diode of each drive circuit in the above-mentioned embodiment can be omitted when disposing a Zener diode in each drive circuit. Furthermore, the Zener diode 5 can also be replaced by a regulated power supply with a small current capacity. Further, only one transistor Q$_1$ can be employed, without performing a Darlington connection.

What is claimed is:

1. A thermal recording apparatus for forming images on a thermosensitive record paper by selectively applying electric power to a plurality of thermal resistors arranged in a recording head in accordance with image information to be recorded, comprising:
   said plurality of thermal resistors divided into a predetermined number of groups;
   a predetermined number of transistor means each including at least one transistor for independently supplying power to respective groups of said thermal resistors; and
   a clamping circuit for maintaining the base voltage of said transistors at a predetermined constant voltage when said thermal transistors are controlled so as to be in an electrically conductive state;
   wherein said predetermined number of transistor means are actuated in a time-divisional manner so as to supply a predetermined, constant electric power from a non-regulated D.C. power source selected of said plurality of thermal resistors in accordance with the image information to be recorded.

2. A thermal recording apparatus as claimed in claim 1, wherein each of said transistors is actuated in a time-divisional manner in accordance with a group-selection drive signal of a facsimile recording apparatus.

3. A thermal recording apparatus as claimed in claim 1, wherein each of said transistor means comprises:
   a pair of Darlington interconnected transistors.

4. A thermal recording apparatus as claimed in claim 1, wherein said clamping circuit comprises:
   a Zener diode which is shared by all of said transistors.

5. A thermal recording apparatus as claimed in claim 1, wherein said clamping circuit comprises:
   a constant-voltage circuit which is shared by all of said transistors.

* * * * *